Nov. 12, 1935.  H. H. McKEE ET AL  2,020,846
MEANS FOR SCALDING HOGS
Filed Jan. 15, 1931   3 Sheets-Sheet 1

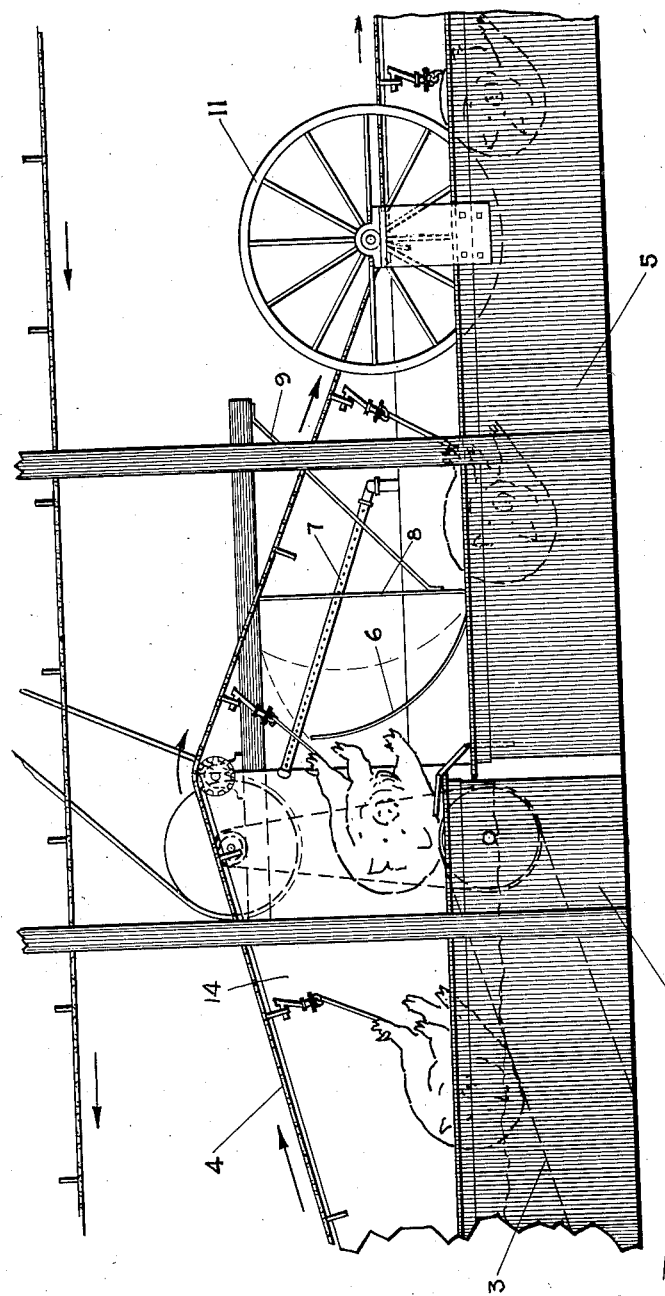

Patented Nov. 12, 1935

2,020,846

UNITED STATES PATENT OFFICE 2,020,846

MEANS FOR SCALDING HOGS

Harry Henry McKee and Levi S. Paddock, Chicago, Ill., assignors, by mesne assignments, to Industrial Patents Corporation, Chicago, Ill., a corporation of Delaware Application January 15, 1931, Serial No. 508,876

8 Claims. (Cl. 17—15)

Our invention relates to improved means for scalding hogs preparatory to dehairing. Numerous methods have been proposed from time to time for the scalding of hog carcasses after killing.

In packing-house practice, after a hog is killed the skin is scalded to permit the removal of the hair with greater ease. One method commonly in use is to dump the hog carcasses into a vat of scolding water which is kept at a high temperature by a steam jacket or other means, and to permit the hogs to float to the other end of the tank to be removed for dehairing. This method often results in over-scalding or under-scalding, and renders it extremely difficult to remove a live hog should one be unwittingly dumped into the tub. By the method employed in our apparatus the hogs are dropped from the bleeding rail into a preliminary soaking vat which carries a water temperature of approximately 90 degrees. A table conveyor removes the hog carcasses from the preliminary soaking vat to the main soaking vat. While the hog is on this table conveyor the gam string is cut and the conveyor hook inserted and hooked into the conveyor. The conveyor moves at a constant rate of speed up to the point at which the hogs are hooked off from the top conveyor and on to the dehairing machine conveyor. This results in the hog carcass remaining in the scalding water for a definite predetermined period of time, all hogs receiving exactly the same scalding treatment. We closely regulate the temperature of the scalding water, preferably allowing a maximum margin of only one degree Fahrenheit, and this exact control of temperature and time results in uniformly good scalding and the elimination of loss resulting from over-scalding hogs.

We find in practice that the best results are obtained by maintaining a temperature of 138° to 140° F. in the scalding tub, and permitting the hogs to remain in the tub for a period of 4½ minutes.

Referring now to the drawings:

Figure 4 is a view showing hogs passing from the preliminary soaking tub to the scalding vat.

Figure 1:
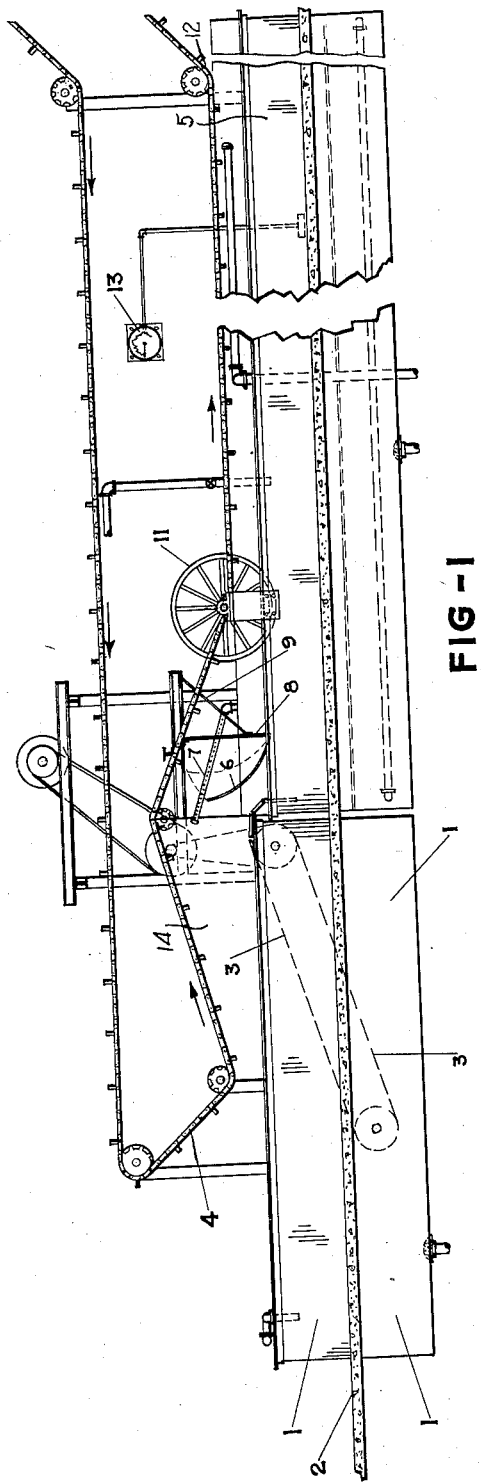
Figure 1 is a sectional view lengthwise of a typical setup.
Figure 2:
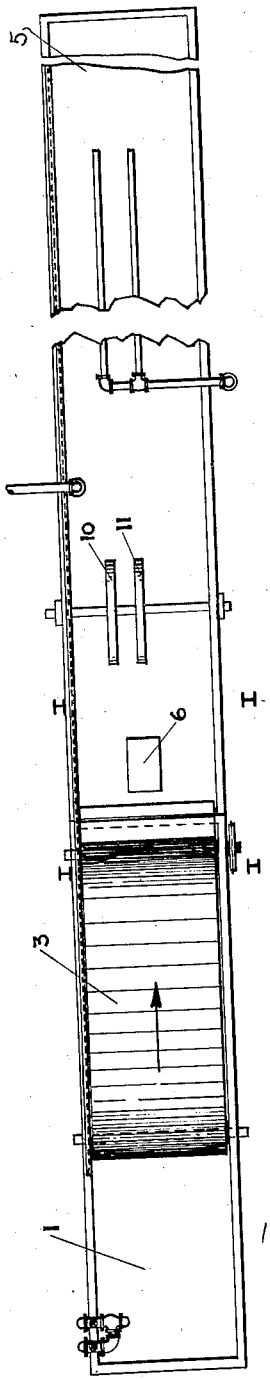
Figure 2 is a plan view.
Figure 3:
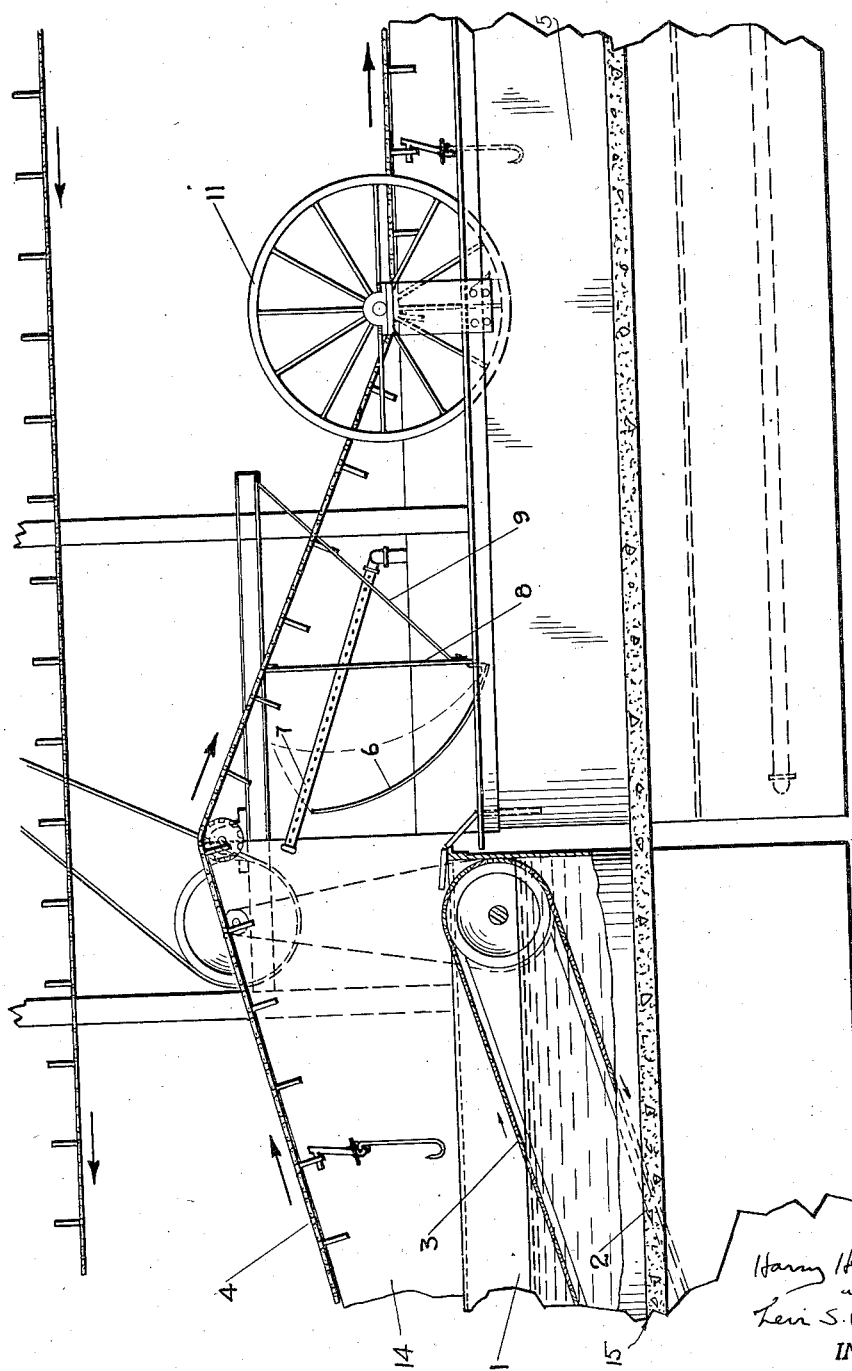
Figure 3 is a detailed view partly in section of the point at which the hog is passed from the preliminary soaking vat to the scalding tub.

Hogs coming from the bleeding rail are dropped into the preliminary soaking vat, having a concrete floor 2 so that the hogs will not fall too far down. A flight conveyor 3 assists in lifting the hogs which are suspended from conveyor chain 4 over into the scalding tub 5. A hinged iron plate 6 prevents the hogs from getting out of alignment; hot water is sprayed over the carcasses through pipe 7, as they pass over into tub 5. Rods 8 and 9 are provided to mount hinged plate 6. Wheels 10 and 11 keep the hogs submerged as they pass through the scalding tub in the direction of the arrows. At 12 it will be noted that the conveyor chain passes up out of the scalding tub. From this point the hogs are carried into a conventional dehairing machine. Thermostatic control is secured by closely checking temperatures on recording indicator 13.

A shield 14 is provided to protect the floor from splashing. The floor line outside the tank is indicated by 15.

It will be understood that changes may be made in the layout shown in the drawings and in the method of scalding without departing from the spirit of our invention as described in the claims which follow.

We claim:

1. A device for scalding hog carcasses comprising a soaking vat, a scalding vat adjacent to the soaking vat, means for conveying the hogs into and through both vats, an upwardly inclined table conveyor in the soaking vat to coact with said conveying means to assist in lifting the carcasses from the soaking vat to the scalding vat, a hinged arcuate shaped element disposed above the entrance end of the scalding vat to control the entrance of the carcasses into the scalding vat, means arranged adjacent said arcuate shaped element to spray carcasses as they pass from the soaking vat to the scalding vat, and wheels mounted over the scalding vat to duck the carcasses passing through the scalding vat.

2. A device for scalding hog carcasses comprising a soaking vat, a scalding vat adjacent the soaking vat, means for conveying the hogs into and through both vats, an upwardly inclined table conveyor in the soaking vat to coact with said conveying means to assist in lifting the carcasses from the soaking vat to the scalding vat, a hinged arcuate shaped element disposed above the entrance end of the scalding vat to control the entrance of the carcasses into the scalding vat, means arranged between said vats to spray the carcasses as they pass from the soaking vat to the scalding vat, and means mounted over the scalding vat to duck the carcasses passing through the scalding vat.

3. In a device for scalding hog carcasses, including a scalding vat and means for conveying the carcasses therethrough, an arcuate shaped vertically movable hinged plate element disposed above the entrance end of the scalding vat to control the entrance of carcasses into said vat.

4. In a device for scalding hog carcasses, including a scalding vat and means for conveying the carcasses therethrough, an arcuate shaped vertically movable hinged plate element disposed above the entrance end of the scalding vat to control the entrance of carcasses into said vat and rotatable ducking wheels mounted above said vat to submerge the carcasses in said vat.

5. In a device for scalding hog carcasses including a scalding vat and means for conveying the carcasses therethrough, rotatable ducking wheels mounted above said vat to submerge the carcasses in said vat, said ducking wheels presenting substantially unbroken peripheries.

6. In a device for scalding hog carcasses including a scalding vat and conveying means adapted to secure a leg of each carcass and move the carcass through the scalding vat while permitting the carcasses to drag freely through scalding water in the vat, an arcuate shaped vertically movable hinged plate element disposed above the entrance end of the scalding vat to control the entrance of carcasses into said vat and rotatable ducking wheels mounted above said vat to submerge the carcasses in said vat.

7. In a device for scalding hog carcasses including a scalding vat and conveying means adapted to secure a leg of each carcass and move the carcass through the scalding vat while permitting the carcass to drag freely in the scalding water in the vat, an arcuate shaped vertically movable hinged plate element disposed above the entrance end of the scalding vat to control the entrance of carcasses into said vat.

8. In a device for scalding hog carcasses including a scalding vat and conveying means adapted to secure a leg of each carcass and to move the carcass through the scalding vat while permitting the carcass to drag freely through scalding water in the vat, rotatable ducking wheels mounted above said vat to submerge the carcasses in said vat while the carcasses are being freely dragged through the scalding water in the vat.

HARRY HENRY McKEE.
LEVI S. PADDOCK.